United States Patent
Götz et al.

(10) Patent No.: US 11,018,791 B2
(45) Date of Patent: May 25, 2021

(54) METHOD AND DEVICE FOR TIME-CONTROLLED DATA TRANSMISSION IN A TIME-SENSITIVE NETWORK

(71) Applicant: SIEMENS AKTIENGESELLSCHAFT, Munich (DE)

(72) Inventors: Franz-Josef Götz, Heideck (DE); An Ninh Nguyen, Nuremberg (DE); Jürgen Schmitt, Fürth (DE); Marcel Kiessling, Velden (DE); Feng Chen, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/492,819

(22) PCT Filed: Mar. 13, 2017

(86) PCT No.: PCT/EP2017/055819
§ 371 (c)(1),
(2) Date: Sep. 10, 2019

(87) PCT Pub. No.: WO2018/166576
PCT Pub. Date: Sep. 20, 2018

(65) Prior Publication Data
US 2020/0213022 A1 Jul. 2, 2020

(51) Int. Cl.
*H04J 3/06* (2006.01)
(52) U.S. Cl.
CPC .......... *H04J 3/0667* (2013.01); *H04J 3/0652* (2013.01); *H04J 3/0673* (2013.01); *H04J 3/0682* (2013.01); *H04J 3/0697* (2013.01)
(58) Field of Classification Search
CPC ....... H04J 3/0082; H04J 3/0667; H04J 3/0652
(Continued)

(56) References Cited

U.S. PATENT DOCUMENTS

| 8,571,005 | B1 * | 10/2013 | Vleugels | H04W 56/002 370/350 |
| 2008/0159337 | A1 | 7/2008 | Lee | |
| 2012/0320916 | A1 * | 12/2012 | Sebastian | H04N 21/6375 370/390 |

FOREIGN PATENT DOCUMENTS

EP  1940089 A1  7/2008

OTHER PUBLICATIONS

"IEEE Standard for Local and metropolitan area networks—Bridges and Bridged Networks—Amendment 25: Enhancements for Scheduled Traffic"; IEEE Std 802.IQbv-2015 (Amendment to IEEE Std 802.IQ—as amended by IEEE Std 802.1Qca-2015, IEEE Std 802.IQcd-2015, and IEEE Std 802.1Q-/Cor Jan. 2015), IEEE Standard, IEEE, Piscataway, NJ, USA, pp. 1-57.
(Continued)

*Primary Examiner* — Angel T Brockman
(74) *Attorney, Agent, or Firm* — Lempia Summerfield Katz LLC

(57) ABSTRACT

The disclosure relates to a method and device for time-controlled data transmission in a TSN. A new traffic shaping method is described for time-sensitive data streams. The objective is to offer the same real-time performance and configuration complexity as in the prior art but without the need for time synchronization throughout the entire network. The traffic shaper provides that a data frame that is received by a bridge in a first-time interval is passed by this bridge to the next hop/bridge in the next time interval. Each bridge knows the start time of the time interval that belongs to a particular data stream. Each data frame must contain a so-called "delay value," thus a delay value which is measured by each bridge using a local clock that measures the delay time spent by the data frame in the queue at the outgoing port.

7 Claims, 2 Drawing Sheets

(58) Field of Classification Search
USPC .......................................................... 370/503
See application file for complete search history.

(56) References Cited

OTHER PUBLICATIONS

PCT International Search Report and Written Opinion of International Searching Authority dated Nov. 30, 2017 corresponding to PCT International Application No. PCT/EP2017/055819 filed Mar. 13, 2017.

* cited by examiner

METHOD AND DEVICE FOR TIME-CONTROLLED DATA TRANSMISSION IN A TIME-SENSITIVE NETWORK

The present patent document is a § 371 nationalization of PCT Application Serial No. PCT/EP2017/055819, filed Mar. 13, 2017, designating the United States, which is hereby incorporated by reference.

BACKGROUND

The extensions of the IEEE TSN Working Group (Time Sensitive Networking, IEEE 802.1) enable real-time communication in networks that work in accordance with the Ethernet standard. The current IEEE standards for TSN in development take particular account of the requirements of the automotive industry and controllers in automation systems with their demands placed on networks in terms of real-time behavior. Mechanisms and protocols are defined to allow deterministic services to be offered for time-sensitive streaming by a network in accordance with the Ethernet standard.

The so-called time-aware shaper (TAS) is defined in the IEEE 802.1Qbv standard and can protect pre-planned scheduled data transfer against interference from other data traffic by using specified time windows so that a deterministic low latency is achieved. If the so-called "cut-through" routing is offered in combination with TAS, then the best real-time performance can be achieved with the lowest latency and minimum delay variance.

Applying a TAS network to a scheduled data transfer requires that all network elements, e.g., both the relay stations/bridges and the end node stations are time synchronized, so that the TAS time windows are scheduled on the same time base.

The scheduling of TAS windows depends on the global network information, for example, on the network topology, and therefore requires a fully managed network. Because of the high planning and management effort and inefficient bandwidth utilization for the remaining data traffic, these networks, such as PROFINET IRT (Isochronous Real-Time) network, are mainly used for hard real-time systems and motion control applications, which place the highest demands on real-time capability and reliability.

For such real-time systems, which are not subject to these very high requirements with minimum latency, other traffic flow rules with lower planning effort than TAS may be used as long as the required determinism is provided.

The so-called credit-based shaper (CBS) was defined in the IEEE standard 802.1Qav by the AVB (Audio-Video-Bridging) Task Group and is intended for audio-video streams with limited latency and freedom from loss in the event of data congestion. CBS smooths the data transfer of the streams by uniform distribution of the data packets over time. The underlying idea is to prevent the concentration of data frames, which might cause overloading of the data buffers of the bridges and the resulting loss of data frames. The limiting of the concentration has the advantage that the data buffer required in the bridges at the outgoing port can be dimensioned smaller and generates a lower maximum delay in the outgoing stream of the bridge.

AVB uses the Stream Reservation Protocol (SRP), which is defined in IEEE 802.1Qat, for the reservation of resources in the network for each individual AVB stream, calculated on the basis of a worst-case delay and with a memory requirement calculated for the bridges based on traffic classes.

It turns out, however, that the worst-case delay per network element (e.g., bridge) in CBS is topology-dependent and the same dependency can be found for the memory requirement. As a result, the worst-case analysis becomes very complex and is topology dependent. Inaccurate worst-case calculations lead to false reservations in the network, there are either too many resources occupied. However, the more problematic case would be the reservation being too low, which leads to unexpected data losses due to inadequately dimensioned bridge memory, ultimately leading to serious errors in the real-time system.

In order to avoid the problems outlined above, a further protocol was defined, the Cyclic Queuing and Forwarding (CQF) protocol, IEEE 802.1Qch. This offers a flow control with a guaranteed maximum latency and a limited delay fluctuation per hop (so-called fixed delivery jitter on each bridge in the network). An example of the sending of data packets in accordance with the CQF protocol is shown in FIG. 2.

In each bridge B1, B2 the time is sub-divided into a sequence of time intervals T of equal length. CQF then requires that a data frame P1, P2, P3, which is received in a first interval in the period between time t1 and t2, is transmitted in the subsequent second interval between t2 and t3 to the next following network element in the path. In particular, this means that the requirement exists that the network is time-synchronized, i.e. all bridges in the network know when the next interval begins and how long it lasts. The synchronization is performed by a central timer MC, which provides that the individual network elements run on the same time base, SYNC.

Since in CQF every data frame is transmitted by a bridge exactly one hop further in the path in the course of the current interval, the delay per hop is limited to twice the length of the time interval T, the worst-case delay.

The maximum latency for the transmission of a frame in the network is thus $$\text{Latency}_{max} = (h+1)*T$$

where h is the number of hops.

If a frame is always transmitted at each hop at the beginning of the next frame and without further delay by interfering data traffic, apart from the delay caused by a shaper in the network, then the minimum latency is calculated as follows:

$$\text{Latency}_{min} = (h-1)*T$$

The transmission jitter in CQF is given by the duration 2T, which is a fixed value regardless of the number of hops in the transmission link. CQF achieves a deterministic latency and a topology-independent jitter, but at the cost of an increased latency in the best case as a result of the wait time in each bridge enforced by the shaper.

The greatest advantage of CQF compared to CBS is the massively reduced complexity in the calculation of the worst-case delay due to the lack of dependence on the network topology. The fixed jitter of the CQF Traffic Class leads to evenly distributed memory sizes in the CQF queues of all bridges, which allows a generalizing approach in the resource calculation model that is suitable for every possible CQF scenario.

In order to provide that the latency limits calculated above can be reached, the duration T of the time intervals is chosen so as to be large enough to provide enough space for all data in a given class-measurement interval, plus a fault frame of maximum size of lower priority.

If the frame pre-emption defined in IEEE 802.1bu/ 802.3.3br is combined with CQF, then the maximum size of a fault fragment can be further reduced to the size of a maximum frame fragment. This means that for the same interval duration T for use with CQF, more stream data can be reserved if pre-emption is used.

Although CQF is superior to CBS regarding technology independence and the simplicity of the calculation of the worst-case latency, CQF also requires a cyclical timing sequence that requires a time-synchronized network as a basis. If CQF is implemented with PSFP (per-stream filtering and policing, IEEE 802.1Qi) and TAS (IEEE 802.QBv), then the CQF at the outgoing port requires two transport-class queues per data stream for a single SR (Stream Reservation) class. The two queues are used in alternating cycles with the aid of input and output gate control, to provide that one queue operates in the buffer status and the other in the transmission mode. Because the traffic classes are a limited resource of a bridge (in the case of an IEEE 802.1Q-compliant bridge there are a maximum of 8), the requirement for two queues per traffic class is regarded as a disadvantage of CQF. The second weak point of CQF is, as already mentioned, the need for time synchronization.

European Patent Application No. 1 940 089 A1 discloses a data transmission method, for example, for the 3G protocols HSDPA (HARQ, 3GPP TS 25.308), which takes account of the delay in the data transmission, accumulates this information over the transmission path and depending on the information, uses a suitable transmission protocol during the transmission to comply with a desired transmission time.

SUMMARY AND DESCRIPTION

It is the object of the disclosure, therefore, to specify a method and a device for transmitting time-critical data packets with a guaranteed maximum latency, a topology-independent latency calculation and a limited variation in the delays, without central time synchronization in the network and/or in the terminals.

The scope of the present disclosure is defined solely by the appended claims and is not affected to any degree by the statements within this summary. The present embodiments may obviate one or more of the drawbacks or limitations in the related art.

The method relates to the time-controlled data transmission of data packets in a time-sensitive network in accordance with the TSN standard. The network includes individual network elements and the time sequence in each network element is divided into pre-scheduled, equal-sized time windows.

The network elements each have their own independent timer and these time windows start and end at the same times in all network elements. The transmission of a data packet from a first network element to a subsequent network element takes place in the time window following the time window in which this data packet was received by a preceding network element.

Each network element then determines, based on its own separate timer and a delay value, the time at which the next transmit window begins and/or ends.

A new traffic shaping method is described for time-sensitive data streams, which hereafter is also referred to as "Packet Delay Variation Compensation (PDVC)". The objective is to offer the same real-time performance and configuration complexity as CQF but without the need for time synchronization throughout the entire network.

The PDVC shaper also provides that a data frame that is received by a bridge in a first-time interval is passed by this bridge to the next hop/bridge in the next time interval.

A difference from CQF is how these time intervals are realized in the bridges. CQF realizes the intervals in the bridge in a certain manner by the use of a cyclic network-central timer and shapes the streams of a given transport class based on the same schedule (a sequence of consecutive time intervals). The cyclic timer of the CQF bridges in the network is run on a common time base, so that the time intervals can be synchronized to the same start time.

The method described here functions without the central time base that is an essential component of the method in accordance with the prior art. Each bridge knows the start time of the time interval that belongs to a particular data stream. This is defined by the source of the stream, (StreamID), by tracking the time sequence of each frame at each hop along the data path from the source to the sink. Each data frame contains a so-called "delay value", thus a delay value which is measured by each bridge using a local clock that measures the delay time spent by the data frame in the queue at the outgoing port. Depending on the implementation, the measured delay value should allow for any delay caused by the PDVC shaper and reflects how the actual transmission time AT differs from the planned transmission time. The planned transmission time for a data frame, (e.g., referred to as the eligibility time ET), is determined by the PDVC shaper at the earliest possible time, when the data frame is entered in the queue of the outgoing transmission port.

The delay value DV which is measured at the bridge is calculated as recited below in formula (1):

$$DV(i)=AT(i)-ET(i) \qquad (1)$$

If the next bridge in the transmission path i+1 receives a data frame with DV(i), then it calculates ET (i+1) for the data frame, as recited below in formula (2):

$$ET(i+1)=T-(DV(i)+CD) \qquad (2)$$

where T is the class measurement interval associated with the stream of this data frame and represents the transmission interval of the stream at its source. As a constant parameter of PDVC for an SR class the value of T is configured on each bridge, either by a network management operation or during the stream reservation with SRP.

CD is a delay value including the following components, which are dependent on the hardware and are frame-size specific. One component is the delay value of the data frame (delay) measured by AT(i), which is the actual start time of the data transmission at the outgoing port of the bridge i at the time when the complete data frame was received at the incoming port of the next bridge i+1. The main part of this delay value can be easily calculated in bridge i+1 based on the speed of the transmission link and the frame size. The remaining part is dependent on the hardware, including the delay value due to the cable (e.g., link propagation delay) between the transmitting bridge i and the receiving bridge i+1, which is also defined by the network management or determined by measurements by a time synchronization protocol, for example, gPTP of 802.1AS, where appropriate. An additional component is the delay value of the switching process in the bridge i+1, which may be a fixed value located in the hardware specification of the bridge.

As indicated in the second formula, PDVC defines the ET for a data frame on the current bridge based on the delay information of the data frame on the previous hop. Such a shaping approach is based on the information from the previous hop and is also known as "Route-based traffic shaping".

BRIEF DESCRIPTION OF THE DRAWINGS

Hereafter, the disclosure is explained by reference to the figures.

DETAILED DESCRIPTION

Figure 2:
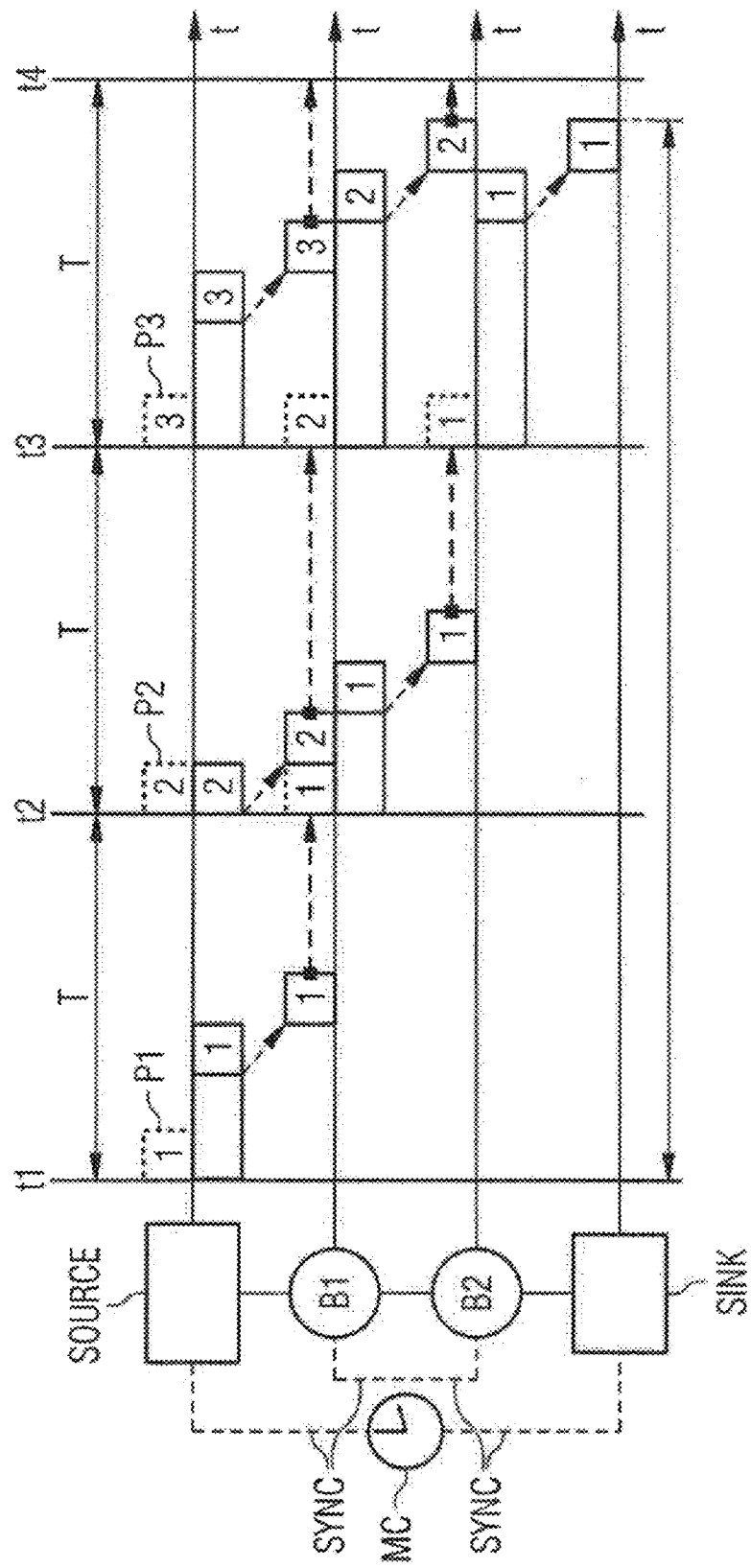
FIG. 2 depicts a procedure in accordance with the prior art.

FIG. 2 has already been explained in detail in the description introduction.

Figure 1:
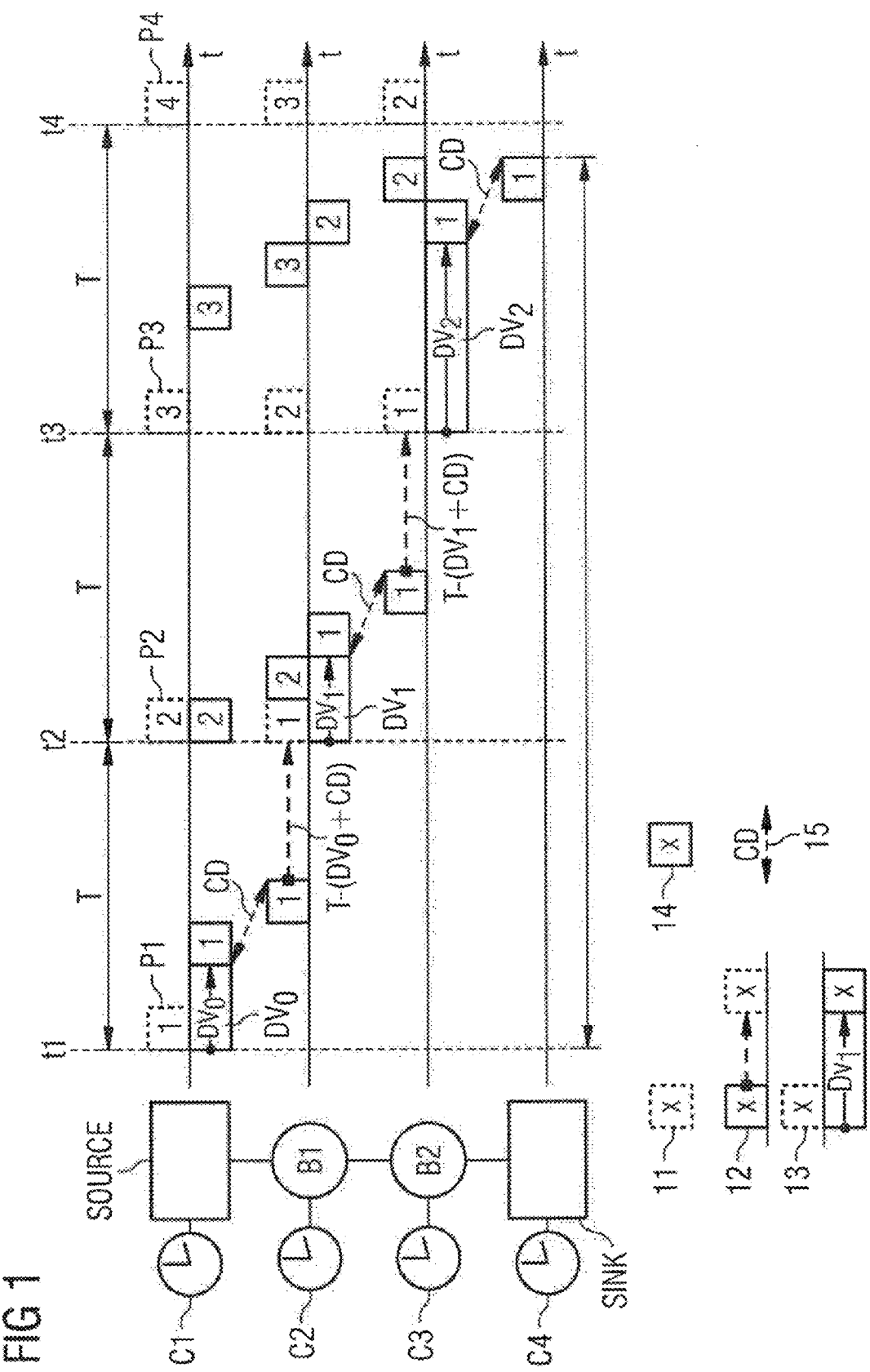
FIG. 1 depicts an example of the procedure according to the disclosure.

FIG. 1 depicts an example of the procedure according to the disclosure, using the PDVC shaper for the transmission of a single data stream from the source 'Source' through 2 bridges B1, B2 to a data sink, Sink. Each of these network elements has its own timer C1 to C4, which is autonomous and not synchronized with any of the other time sources.

As illustrated, the data source, Source, periodically generates a frame P1, P2, P3, P4 at the times t1, t2, t3, t4, wherein a constant time interval T is present between each of the times t1 to t4. The start time of the respective time interval is shown in the figure by a dashed vertical line. The data packets in dashed lines indicate the time at which the packet is scheduled to be sent, the packets with a solid line below the respective time line t of each network element then indicate the actual time at which the packet (e.g., in the same time window) is sent. With the aid of the delay value DV0, DV1, DV2, which arises due to the time spent in the outgoing queue of the outgoing port of the respective network element, which delay is measured at each hop and is also transmitted to the next network element as an additional data field in the frame, any subsequent receiving bridge B1, B2 can temporally realign the time of the transmission of the data frame. The transmission time is calculated according to the formula for ET(i+1) given above.

CD denotes an additional constant delay per hop. This feature of PDVC is advantageous for the control application, where a number of streams into the network from various data sources at different times in a coordinated manner. PDVC can the same transmission sequences for all streams at the outgoing port of each bridge along the data transmission path.

In order to provide that PDVC is working correctly, PDVC is applied on all bridges B1, B2 along the data transmission path, as well as in the data sources if these data sources also generate other data traffic, which is in conflict with the first data traffic, and delay the scheduled transmission.

The maximum delay per bridge and the maximum end-to-end latency of PDVC are similar to CQF due to the dependence on the interval T and the number of hops h.

PDVC per bridge delay<2T per hop delivery jitter=2T (h−1)*T<PDVC end-to-end latency<h*T The above-mentioned limits are calculated under the condition of formula 2, that the value of T is always less than any possible value of (DV(i)+CD) that can occur. In order to provide that the condition is always satisfied, the same conditions as in CQF apply to the selection of T by taking into account the maximum amount of stream data observed during the time interval T, plus an interfering data frame of maximum size. Similarly to CQF, a combined use of frame pre-emption and PDVC helps reduce the number of possible stream data for a fixed time interval T, or the time interval T, for the same amount of stream data resulting in a reduced worst-case latency.

In the example of FIG. 1, additional time deviations of the individual local timers, used for time calculations of the shaper, are ignored. Such discrepancies between the distributed clocks do not interfere with the operation of PDVC, however, they can cause violations of the desired delay limits in the transmitted streams. In order to avoid this effect, the maximum time deviation that can occur between two local clocks in the network may be considered as an additional factor in the configuration of PDVC, either by increasing the value of T or reducing the number of reserved streams.

The traffic shaper described here offers a similar level of real-time performance with a fixed maximum latency and fixed delivery jitter to CQF. This capability is required in a multitude of industrial applications and control systems that do not require the absolute maximum in real-time capability performance. The greatest advantage compared to the standardized solution is that the solution does not rely on a time-synchronized network such as IEEE 1588 PTP or IEEE 802.1AS and thus can save the associated costs.

The main method applied is the so-called traffic shaping to obtain a deterministic performance, which forces a delay for each data frame at each hop, in order thus to provide the periodic stream traffic through the network with a fixed per-hop delay. Unlike in CQF, which calculates the value of the shaper-induced delay based on a global timer, PDVC takes these decisions based on previous hop information, which is measured by local clocks and is transmitted from bridge to bridge in each frame.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for time-controlled data transmission in a time-sensitive network in accordance with a time-sensitive network standard, wherein each data packet is assigned to a data stream and is characterized by a unique StreamID, wherein the time-sensitive network comprises individual network elements, wherein a time sequence in each individual network element of the time-sensitive network is divided into pre-scheduled, equal-sized time windows, wherein each network element has an independent timer that is not synchronized with timers of other network elements, wherein the equal-sized time windows for all network elements start and end at same time points, wherein the data transmission of a data packet from a first network element to a subsequent network element takes place in the time window following the time window in which the data packet was received by a preceding network element, the method comprising:

determining, by each network element, a start time of a time window that belongs to a data stream;

calculating a delay value in a transmitting network element in dependence on the assigned data stream;

transmitting the calculated delay value in the data packet to the receiving network element; and determining, by each network element, at what time point a next time window for transmitting begins and/or ends, wherein the determining is based on the calculated delay value and the independent timer of the respective network element, which is not synchronized with timers of other network elements.

2. The method of claim 1, wherein the calculated delay value is calculated from an actual transmission time minus a scheduled transmission time.

3. The method of claim 2, wherein the scheduled transmission time is calculated in a next transmission step by a measurement interval minus a sum of a delay time plus an additional delay value.

4. The method of claim 3, wherein, for determining the additional delay value, the actual transmission time for the data packet is determined by determining a duration of the data transmission using the start time of the data transmission at the transmitting network element until a complete reception of the data packet on the receiving network element plus a hardware-dependent time delay component and a duration of a switching process in the network element.

5. The method of claim 4, wherein the duration of the data transmission and the duration of the switching process are determined in advance by a time synchronization protocol.

6. A time-sensitive network in accordance with a time-sensitive network standard, the time-sensitive network comprising:

a plurality of individual network elements, wherein a time sequence in each network element is divided into pre-scheduled, equal-sized time windows, wherein each network element has independent timer that is not synchronized with timers of other network elements, and wherein the equal-sized time windows for all network elements start and end at same time points, wherein each data packet to be transmitted is assigned to a data stream and characterized by a unique StreamID, wherein a transmission of data packet by a network element to a successive network element of the plurality of individual network elements is configured to take place in a time window which follows a time window in which the data packet was received by a preceding network element, wherein each network element is configured to know a start time of a time window that belongs to a data stream, and wherein each network element is configured to determine, based on a delay value and the independent timer of the respective network element that is not synchronized with timers of other network elements, at what time point a next time window for transmitting begins and/or ends by calculating the delay value in a transmitting network element depending on an associated data stream and transmitting the calculated delay value to the receiving network element.

7. A device comprising:

a plurality of network elements; and a transmitting network element, wherein the device is configured to:

determine, by each network element of the plurality of network elements, a start time of a time window that belongs to a data stream;

calculate a required delay value in the transmitting network element in dependence on an assigned data stream;

transmit the calculated delay value in a data packet to a receiving network element; and determine, by each network element, at what time point a next time window for transmitting begins and/or ends, wherein the determination is based on the calculated delay value and an independent timer of the respective network element, which is not synchronized with timers of other network elements.

\* \* \* \* \*